US005810147A

United States Patent [19]

Vanmoor

[11] Patent Number: 5,810,147

[45] Date of Patent: Sep. 22, 1998

[54] PASSENGER CONVEYOR SAFETY APPARATUS

[76] Inventor: Arthur Vanmoor, 1876 West Dixie Highway #209, North Miami Beach, Fla. 33180

[21] Appl. No.: 770,388

[22] Filed: Dec. 2, 1996

[30] Foreign Application Priority Data

Nov. 30, 1995 [NL] Netherlands ........................... 1001785

[51] Int. Cl.[6] ..................................................... B65G 43/00

[52] U.S. Cl. ............................................ 198/323; 198/326

[58] Field of Search .................................... 198/323, 326, 198/333, 335, 502.1

[56] References Cited

U.S. PATENT DOCUMENTS

| | | | |
|---|---|---|---|
| 2,193,583 | 3/1940 | Dunlop | 198/326 |
| 2,846,045 | 8/1958 | Fowler | 198/323 |
| 3,616,891 | 11/1971 | Earle | 198/333 |
| 3,986,595 | 10/1976 | Asano et al. | 198/333 |
| 4,397,383 | 8/1983 | James | 198/333 |
| 4,519,490 | 5/1985 | White | 198/333 |
| 4,629,052 | 12/1986 | Kitamura | 198/323 |
| 4,669,597 | 6/1987 | Langer et al. | 198/323 |
| 5,082,102 | 1/1992 | Reichmuth | 198/333 |
| 5,242,042 | 9/1993 | Mauldin | 198/333 |

FOREIGN PATENT DOCUMENTS

| | | | |
|---|---|---|---|
| 0123092 | 5/1990 | Japan | 198/323 |
| 3158387 | 7/1991 | Japan | 198/323 |
| 4-28692 | 1/1992 | Japan | 198/323 |
| 2069438 | 8/1981 | United Kingdom | 198/326 |

OTHER PUBLICATIONS

Metro Using Brushes on Escalator Gas Problem, Stephen C. Fehr Washington Post, Sep. 9, 1994.

*Primary Examiner*—James R. Bidwell
*Attorney, Agent, or Firm*—Herbert L. Lerner; Laurence A. Greenberg

[57] ABSTRACT

In an escalator or a moving sidewalk having a skirt panel and, a step or a walk path, defining a gap between the skirt panel and the step or the walk path, a passenger conveyor safety apparatus comprising a main body member having a recessed groove formed therein. A set of brushes residing in the recessed groove, protruding out from the main body member and extending past the gap for preventing an object from being entrapped in the gap.

9 Claims, 6 Drawing Sheets

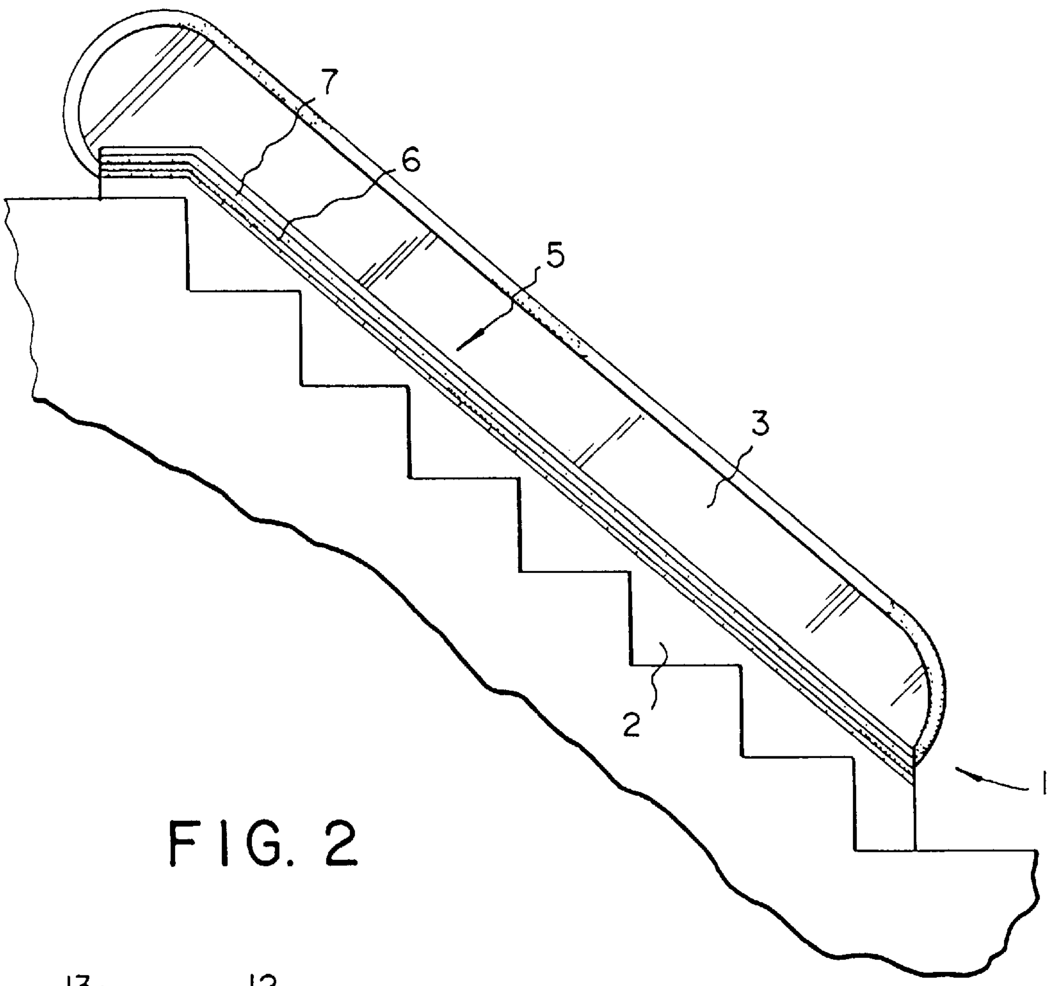
FIG. 2
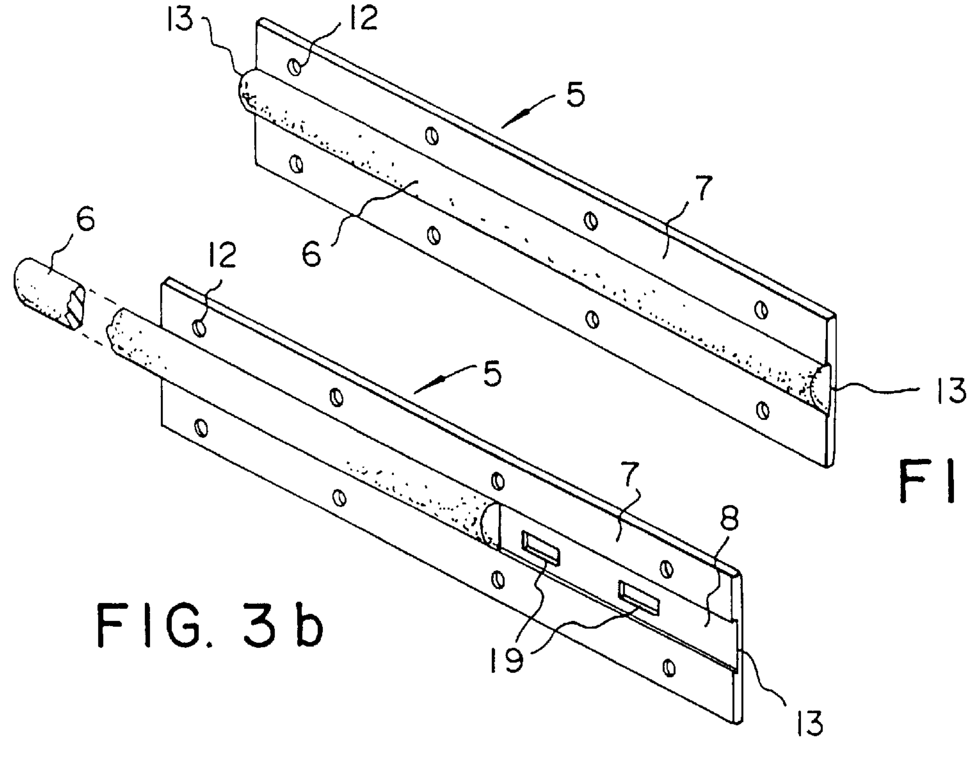
FIG. 3a
FIG. 3b

PASSENGER CONVEYOR SAFETY APPARATUS

BACKGROUND OF THE INVENTION

1. Field of the Invention

The invention relates generally to continuous passenger conveyor assemblies such as escalators and moving walkways, and more particularly, to an apparatus for preventing passenger and apparel entrapment in the conveyor assembly.

2. Description of the Related Art

In all escalator systems and moving walkways, a running clearance gap exists between the lateral edges of the moving stairs or walkway and the adjacent, stationary skirt panel. The gap allows the movement of the stairs or walkway without contacting the skirt panel. Consequently, various objects may intrude into this open gap and become entrapped therein. Objects such as passenger body extremities including fingers or toes or passenger apparel such as footwear, loose clothing and the like, come in contact with the skirt panel. The frictional force between the contacting object and the skirt panel induce the object into the gap. When the entrapment occurs, the pinching, drawing and knurling action exerted on the trapped object results in the cutting and mutilation of the entrapped object.

Various prior art safety devices for escalators and moving walkways are known for preventing accidents. One such safety device is shown in U.S. Pat. No. 5,082,102 to Reichmuth. Reichmuth teaches a safety apparatus which covers the gap between the movable step and the stationary skirt panel. The safety apparatus is formed of a synthetic material with a low coefficient of friction. The safety apparatus is fastened to the escalator step and glides against the skirt panel. The installation of the safety apparatus requires the clearance of the passage between the step and the skirt panel be increased. The time and costs for installing the safety apparatus are significant. In addition, there is introduced a device which is in constant frictional contact with the skirt panel leading to increased maintenance and operational costs.

U.S. Pat. Nos. 4,519,490 to White, 4,397,383 to James, 3,986,595 to Asano et al. and 5,242,042 to Mauldin show various types of gap covering devices. However, all of them have a significant cost in installation, maintenance and operations.

SUMMARY OF THE INVENTION

It is accordingly an object of the invention to provide a passenger conveyor safety apparatus, which overcomes the herein-mentioned disadvantages of the heretofore-known devices of this general type, and which provides an inexpensive and easy to install apparatus for preventing objects and body extremities from being entrapped in a gap of a conveyor assembly.

With the foregoing and other objects in view there is provided, in accordance with the invention, an escalator or a moving sidewalk having a skirt panel and, a step or a walk path, defining a gap between the skirt panel and the step or the walk path, a passenger conveyor safety apparatus comprising a main body member having a recessed groove formed therein; and a set of brushes residing in the recessed groove, protruding out from the main body member and extending past the gap for preventing an object from being entrapped in the gap.

In accordance with an added feature of the invention, the set of brushes has a back plate and brush bristles.

In accordance with an additional feature of the invention, the brush bristles are perpendicular to the main body member.

In accordance with another feature of the invention, the brush bristles are at an angle from 0–90 degrees in relation to the main body member.

In accordance with an additional feature of the invention, the brush bristles are shorter increasingly longer up to a desired length for covering the gap, as seen along the back plate.

In accordance with an added feature of the invention, there is a set of hinged locking members connected at both ends of the recessed groove on the main body member for locking and releasing the set of brushes in the recessed groove.

In accordance with yet another feature of the invention, the main body member has a plurality of holes for receiving a fastener to attach the main body member to the skirt panel.

In accordance with a concomitant feature of the invention, there is a switch disposed in the recessed groove for causing a warning signal to be emitted upon the switch being contacted by the set of brushes.

In the invention of the instant application, there is provided a passenger conveyor safety apparatus which is inexpensive to install and is easy to maintain. Once installed the only maintenance cost would be replacement of the brush set. The configuration of the passenger conveyor safety apparatus allows for a quick and easy brush replacement process. Because the brushes do not come into contact with the moving steps or walkway, the wear and tear on the brushes is minimal. In contrast, the prior art devices are in constant frictional contact with the skirt panel resulting in higher maintenance requirements. In addition, the passenger conveyor safety apparatus can be installed without requiring major modification to the escalator or moving walkway. The escalator or moving walkway need only have holes drilled in the skirt panel for installation of the passenger conveyor safety apparatus.

With the foregoing and other objects in view there is provided, in accordance with the invention, an escalator or a moving sidewalk having a skirt panel and, a step or a walk path, defining a gap between the skirt panel and the step or the walk path, a passenger conveyor safety apparatus comprising a main body member and a warning device residing on the main body member for causing a warning signal to be emitted upon an object approaching the gap.

In accordance with an added feature of the invention, the warning device is a light being illuminated upon the object approaching the gap.

In accordance with another feature of the invention, the warning device is a light beam transmitting device sounding an audible alarm upon the object approaching the gap.

Other characteristic features of the invention are set forth in the appended claims.

Although the invention is illustrated and described herein as embodied in a passenger conveyor safety apparatus, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF DESCRIPTION OF THE DRAWINGS

FIG. 2 is a fragmentary, side-elevation view of the escalator with a passenger conveyor safety apparatus installed according to the invention;

FIG. 3*a* is a front-elevational view of the passenger conveyor safety apparatus;

FIG. 3*b* is a front-elevational view of the passenger conveyor safety apparatus with a set of brushes partially removed;

DESCRIPTION OF THE PREFERRED EMBODIMENTS

Figure 1:
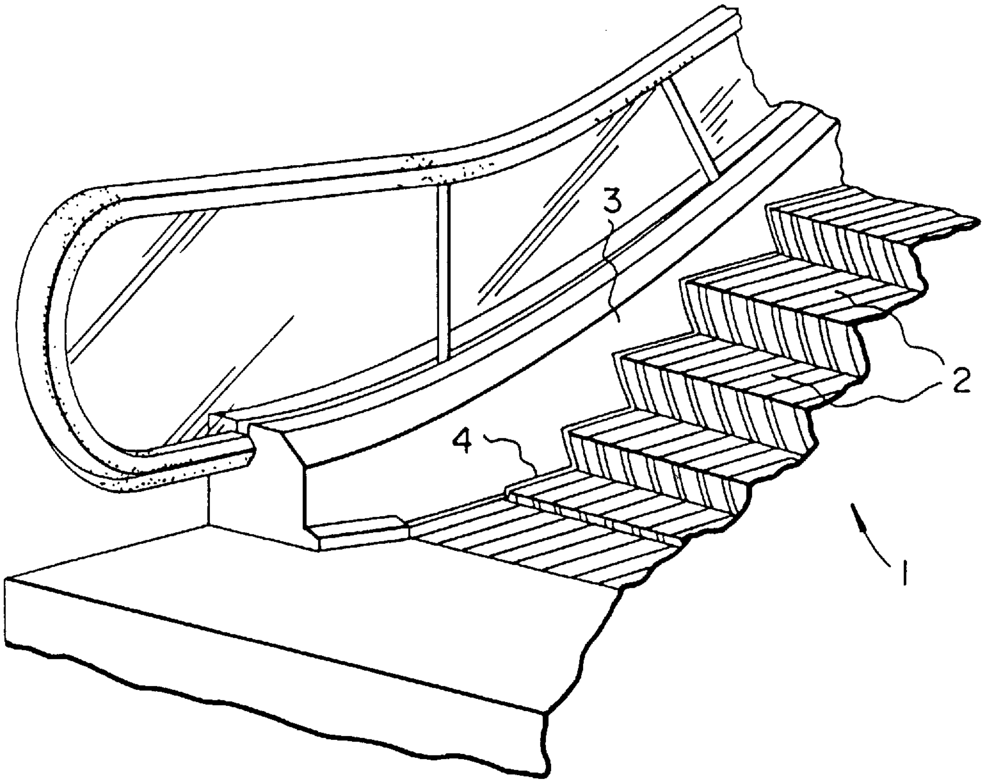
FIG. 1 PRIOR ART
FIG. 1 is a diagramatic, fragmentary, perspective view of a section of a typical escalator.

Referring now to the figures of the drawings in detail and first, particularly, to FIG. 1 thereof, there is shown a typical escalator 1 having movable steps 2, a stationary skirt panel 3 and a gap 4 between the movable steps 2 and the skirt panel 3.

FIG. 2 shows a passenger conveyor safety apparatus 5 installed on the skirt panel 3 of the escalator 1. The passenger conveyor safety apparatus 5 has a removable set of brushes 6 and a main body member 7.

Figure 3C:
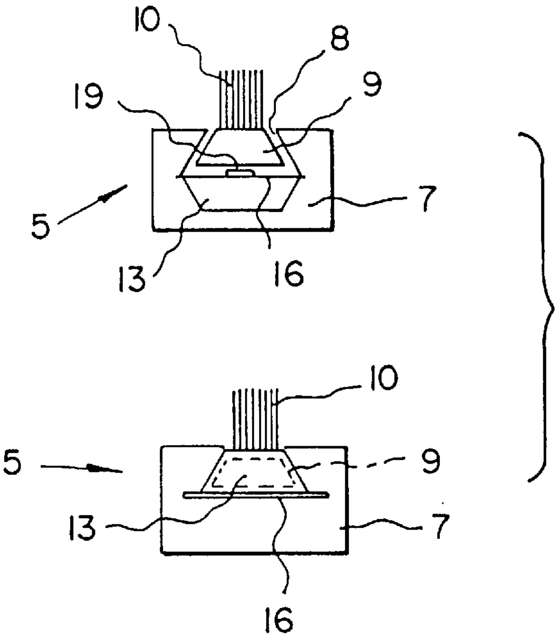
FIG. 3*c* is a side-elevation view of the passenger conveyor safety apparatus highlighting a groove for holding the set of brushes.

FIGS. 3*a*, 3*b* and 3*c* show an enlarged view of the passenger conveyor safety apparatus 5. A main body member 7 has a plurality of holes 12 which accommodate unillustrated fasteners such as screws or rivets for fastening the passenger conveyor safety apparatus 5 to the skirt panel 3 as shown in FIG. 2. The main body member 7 also has a recessed groove 8 for accepting and holding a set of brushes 6. When worn out, the brushes 6 can be quickly replaced by sliding the old brush set 6 out of recessed groove 8 and inserting a new set of brushes 6. At both ends of the recessed groove 8 are hinged locking members 13. The hinged locking members 13 rotate around the axis of hinge 16. The hinged locking members 13 in the upright (closed) position secure the set of brushes in the recessed groove 8. When the hinged locking member 13 is in the open position, as shown in FIG. 3*c*, the set of brushes 6 may be removed. In addition, FIG. 3*b* shows a plurality of switches 19. If the set of brushes makes contact with the switch a warning signal is emitted. The warning signal can be an audio alarm or a light alarm contained on the switch. The set of brushes will activate the switch when an object pushes against the set of brush with sufficient force to push the set of brushes into the switch.

Figure 4A:
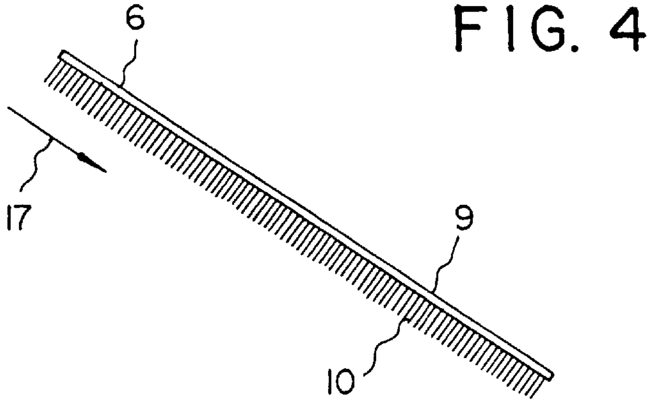
FIG. 4*a* is a top-plan view of the brushes.
Figure 4B:
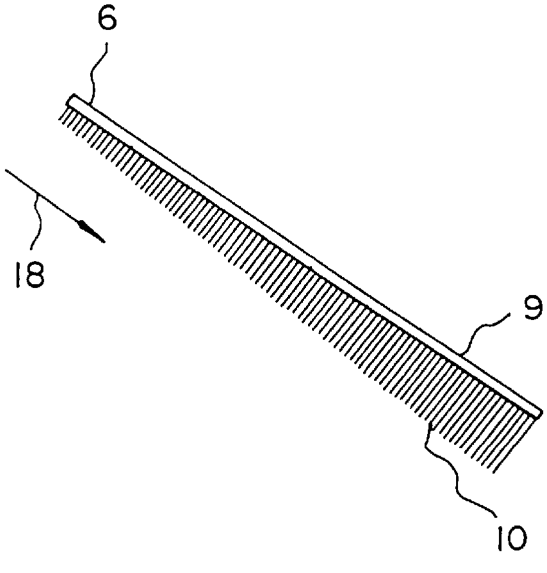
FIG. 4*b* is a top-plan view of a second embodiment of the brushes.

FIGS. 4*a* and 4*b* show two embodiments of the set of brushes 6. The brushes 6 are configured with a back plate 9 holding brush bristles 10. The back plate 9 is configured to slide in the recessed groove 8 of the main body member 7. The brush bristles 10 can be configured to protrude straight out from the back plate 9 as shown in FIG. 4*a*. The brush bristles 10 can also protrude in a downward direction and/or in an angled direction that is directed toward the movement of the steps as is shown by direction arrows 17 and 18. The angle can be anywhere from 0–90 degrees in relationship to the main body member 7. The brush bristles 10 can be configured in various lengths depending on the size of the gap 4 or the level of coverage over the gap 4 that is desired. The brush bristles 10 can also be configured to be initially short and then become increasingly long as shown in FIG. 4*b*. That configuration will allow less of a starting friction in the initial contact with the passenger conveyor safety apparatus 5.

Figure 5A:
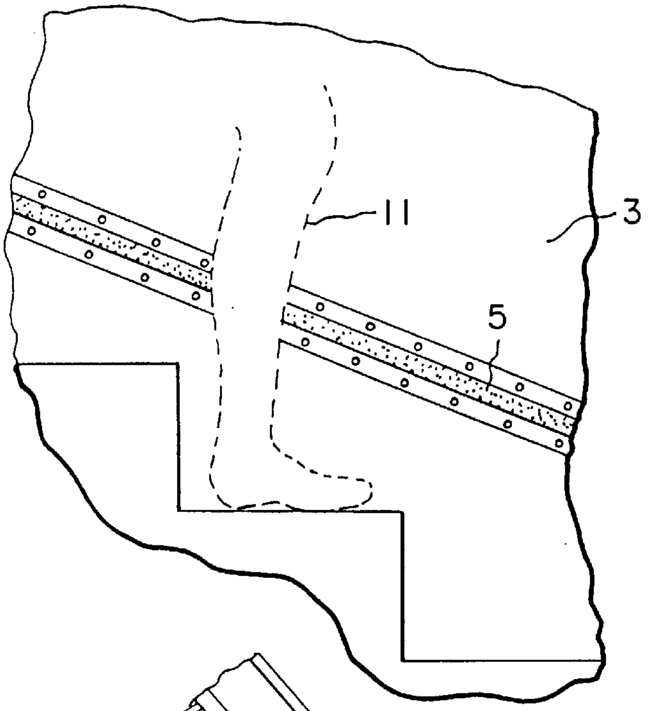
FIG. 5*a* is a fragmentary, side-elevation view of the passenger conveyor safety apparatus pushing against a human leg.
Figure 5B:
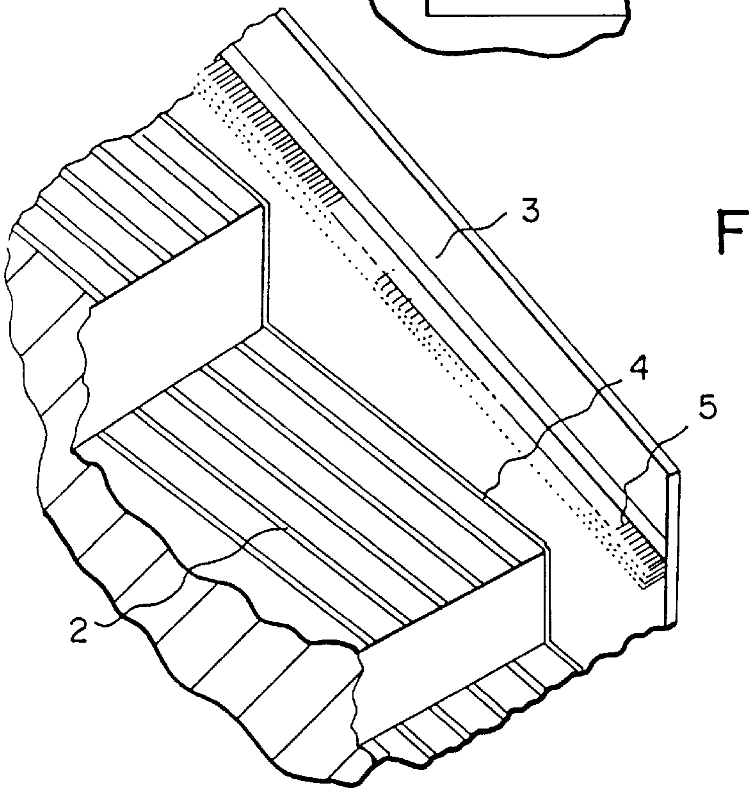
FIG. 5*b* is fragmentary, perspective view of the passenger conveyor safety apparatus.
Figure 5C:
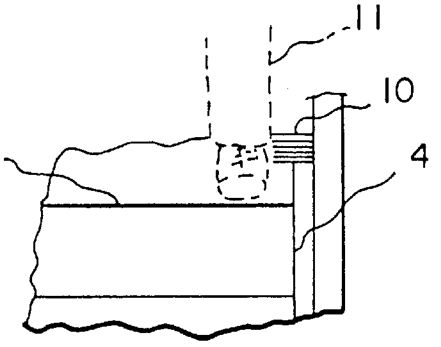
FIG. 5*c* is a fragmentary, front-elevational view highlighting the set of brushes covering a gap in the escalator.

FIG. 5*a* shows the passenger conveyor safety apparatus 5 coming into contact with a human leg 11 and pushing against the human leg 11. FIGS. 5*b* and 5*c* show how the brush bristles 10 extend over the gap 4 and prevent an object such as the leg 11 from coming into contact with the gap 4. FIG. 5*c* shows the brush bristles 10 pushing on a leg 11 shown in the direction from toe to heel. In addition, the passenger conveyor safety apparatus 5 prevents contact with the skirt panel 3. An object that comes into contact with the skirt panel 3 experiences a frictional force that moves the object in the direction of the gap 4. Because the passenger conveyor safety apparatus reduces contact with the skirt panel 3, the accidents caused by the skirt panel's 3 frictional forces are also reduced.

Figure 6:
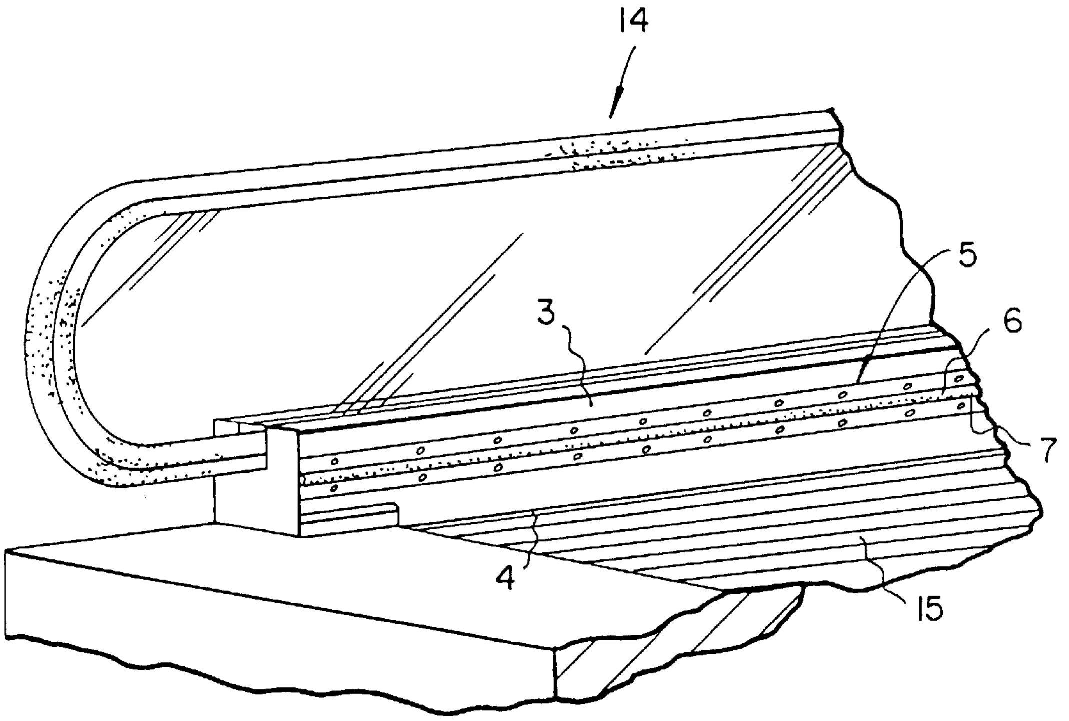
FIG. 6 is a fragmentary, perspective view of a section of a typical moving walkway equipped with the passenger conveyor safety apparatus.

FIG. 6 shows a typical moving walkway 14 equipped with the passenger conveyor safety apparatus 5. The moving walkway 14 has a walk path 15, a skirt panel 3 and a gap 4 between the skirt panel 3 and the walk path 15. Although the invention is illustrated to be used with an escalator or a moving walkway, it can easily be configured to be applied to any device that has an exposed gap 4.

Figure 7:
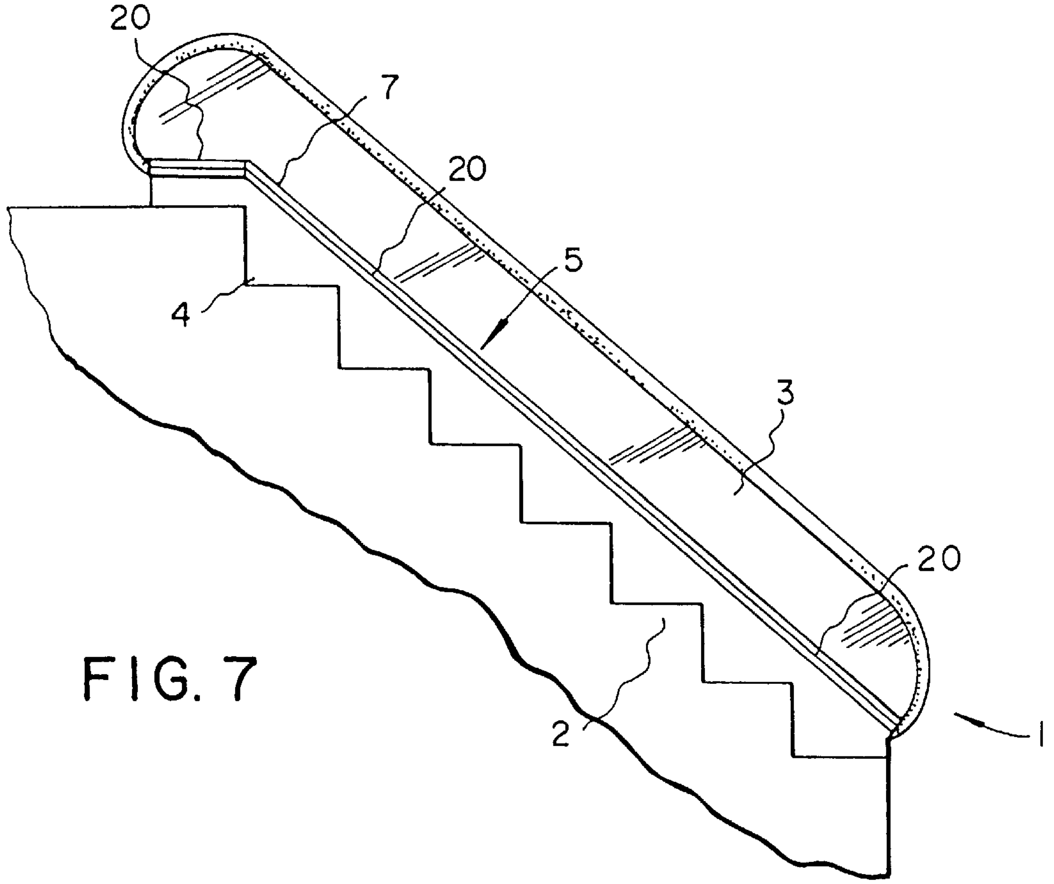
FIG. 7 is a fragmentary, side-elevation view of the escalator with a second embodiment of the passenger conveyor safety apparatus installed.

FIG. 7 shows a second embodiment of the passenger conveyor safety apparatus 5. The main body member 7 contains a warning device such as a light 20. The light illuminates when an object approaches the light 20. As shown in FIG. 7, the light 20 is in close proximity to the gap 4. In addition, the light 20 can be illuminated at all times. When the object comes in closer proximity to the light, the illumination level of the light increases and thus provides a visual warning.

Figure 8:
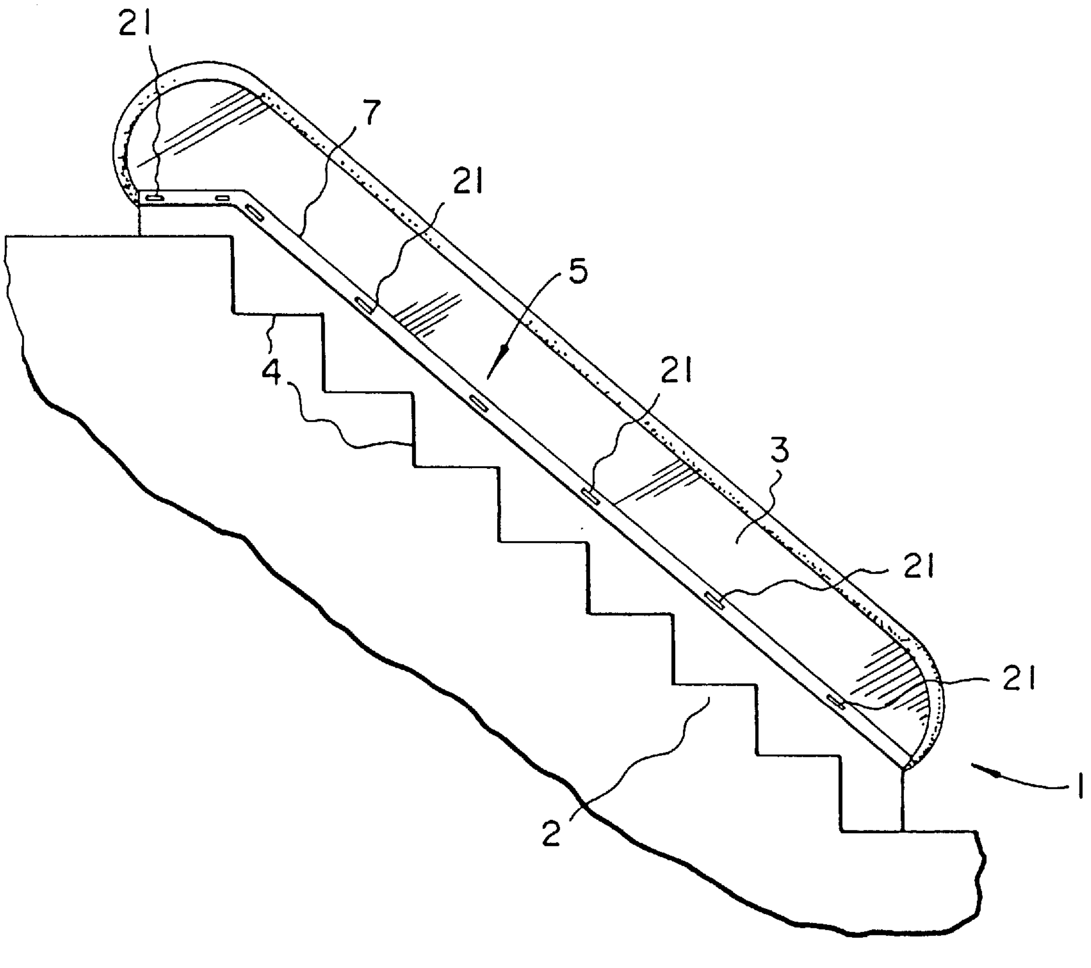
FIG. 8 is a fragmentary, side-elevation view of the escalator with a third embodiment of the passenger conveyor safety apparatus installed according to the invention.

FIG. 8 shows a third embodiment of the passenger conveyor safety apparatus 5. The main body member 7 contains a warning device such as a light beam transmitting device 21 which has a built in audio alarm. When a light beam from the light beam transmitting device is broken, the light beam transmitting device emits an audible warning signal or alarm.

I claim:

1. In an escalator or a moving sidewalk having a skirt panel and, a step or a walk path, defining a gap between the skirt panel and the step or the walk path, a passenger conveyor safety apparatus comprising:
   - a main body member having a recessed groove formed therein;
   - a set of brushes having a backplate and brush bristles, said set of brushes residing in said recessed groove, protruding out from said main body member and extending past a gap for preventing an object from being entrapped in the gap; and said brush bristles having a length being increased up to a desired length for covering the gap, as seen along said back plate.

2. The passenger conveyor safety apparatus according to claim 1, wherein said main body member has a plurality of holes for receiving a fastener to attach said main body member to the skirt panel.

3. The passenger conveyor safety apparatus according to claim 1, wherein said brush bristles are perpendicular to said main body member.

4. The passenger conveyor safety apparatus according to claim 1, wherein said brush bristles are at an angle from 0–90 degrees in relation to said main body member.

5. In an escalator or a moving sidewalk having a skirt panel and, a step or a walk path, defining a gap between the skirt panel and the step or the walk path, a passenger conveyor safety apparatus comprising:

a main body member having a recessed groove formed therein;

a set of brushes residing in said recessed groove, protruding out from said main body member and extending past the gap for preventing an object from being entrapped in the gap; and a set of hinged locking members connected at both ends of said recessed groove on said main body member for locking and releasing said set of brushes in said recessed groove.

6. In an escalator or a moving sidewalk having a skirt panel and, a step or a walk path, defining a gap between the skirt panel and the step or the walk path, a passenger conveyor safety apparatus comprising:

a main body member having a recessed groove formed therein;

a set of brushes residing in said recessed groove, protruding out from said main body member and extending past the gap for preventing an object from being entrapped in the gap; and a switch disposed in said recessed groove for causing a warning signal to be emitted upon said switch being contacted by said set of brushes.

7. In an escalator or a moving sidewalk having a skirt panel and, a step or a walk path, defining a gap between the skirt panel and the step or the walk path, a passenger conveyor safety apparatus comprising:

a main body member; and a warning device residing on said main body member for causing a warning signal to be emitted upon an object approaching the gap.

8. The passenger conveyor safety apparatus according to claim 7, wherein said warning device is a light being illuminated upon the object approaching the gap.

9. The passenger conveyor safety apparatus according to claim 7, wherein said warning device is a light beam transmitting device sounding an audible alarm upon the object approaching the gap.

* * * * *

UNITED STATES PATENT AND TRADEMARK OFFICE
CERTIFICATE OF CORRECTION

PATENT NO : 5,810,147

DATED : September 22, 1998

INVENTOR(S) : Arthur Vanmoor

It is certified that error appears in the above-identified patent and that said Letters Patent is hereby corrected as shown below:

On the title page,

Item [76] should read as follows:

Arthur Vanmoor. 153 E. Palmetto Park Road, Suite 219 Boca Raton, Florida 33432

Signed and Sealed this

Nineteenth Day of January, 1999

Attest:

*Attesting Officer*

*Acting Commissioner of Patents and Trademarks*

US005810147C1

(12) EX PARTE REEXAMINATION CERTIFICATE (6623rd)

United States Patent

(10) Number: US 5,810,147 C1
(45) Certificate Issued: Jan. 20, 2009

Vanmoor

(54) PASSENGER CONVEYOR SAFETY APPARATUS

(76) Inventor: Arthur Vanmoor, 1876 W. Dixie Highway #209, North Miami Beach, FL (US) 33180

Reexamination Request:
No. 90/007,975, Mar. 17, 2006

Reexamination Certificate for:

| | |
|---|---|
| Patent No.: | **5,810,147** |
| Issued: | **Sep. 22, 1998** |
| Appl. No.: | **08/770,388** |
| Filed: | **Dec. 2, 1996** |

Certificate of Correction issued Jan. 19, 1999.

(51) Int. Cl.

| | |
|---|---|
| ***B66B 29/00*** | (2006.01) |
| ***B66B 29/04*** | (2006.01) |
| ***B65G 43/00*** | (2006.01) |

(52) U.S. Cl. ........................................ 198/323; 198/326
(58) Field of Classification Search ......................... None
See application file for complete search history.

(56) References Cited

FOREIGN PATENT DOCUMENTS

GB 2 069 438 A 8/1981

OTHER PUBLICATIONS

UK Certificate of Registration of Design, Registration No. 1005780, issued Nov. 1982 to Kleeneze Industrial Ltd.*

Elevatori, The European Elevator Magazine, I.S.S.N. 1121-7995.

* cited by examiner

*Primary Examiner*—David O. Reip

(57) ABSTRACT

In an escalator or a moving sidewalk having a skirt panel and, a step or a walk path, defining a gap between the skirt panel and the step or the walk path, a passenger conveyor safety apparatus comprising a main body member having a recessed groove formed therein. A set of brushes residing in the recessed groove, protruding out from the main body member and extending past the gap for preventing an object from being entrapped in the gap.

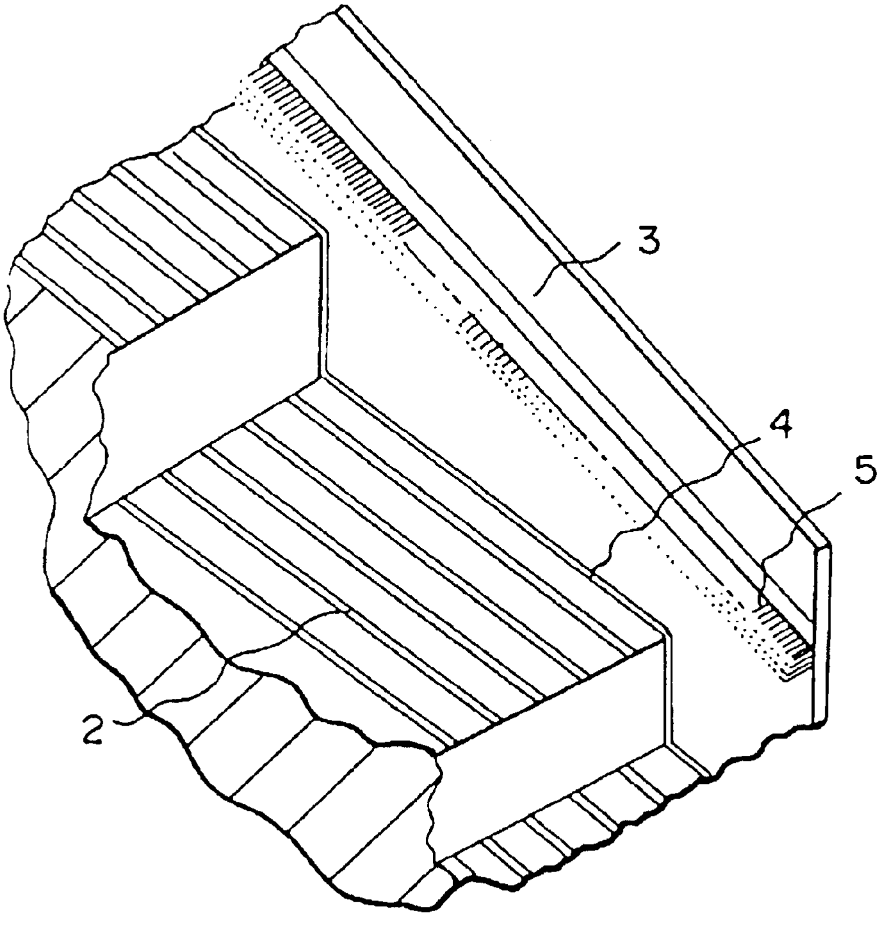

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–4 are cancelled.

Claims 5–9 were not reexamined.

* * * * *